Patented June 24, 1924.

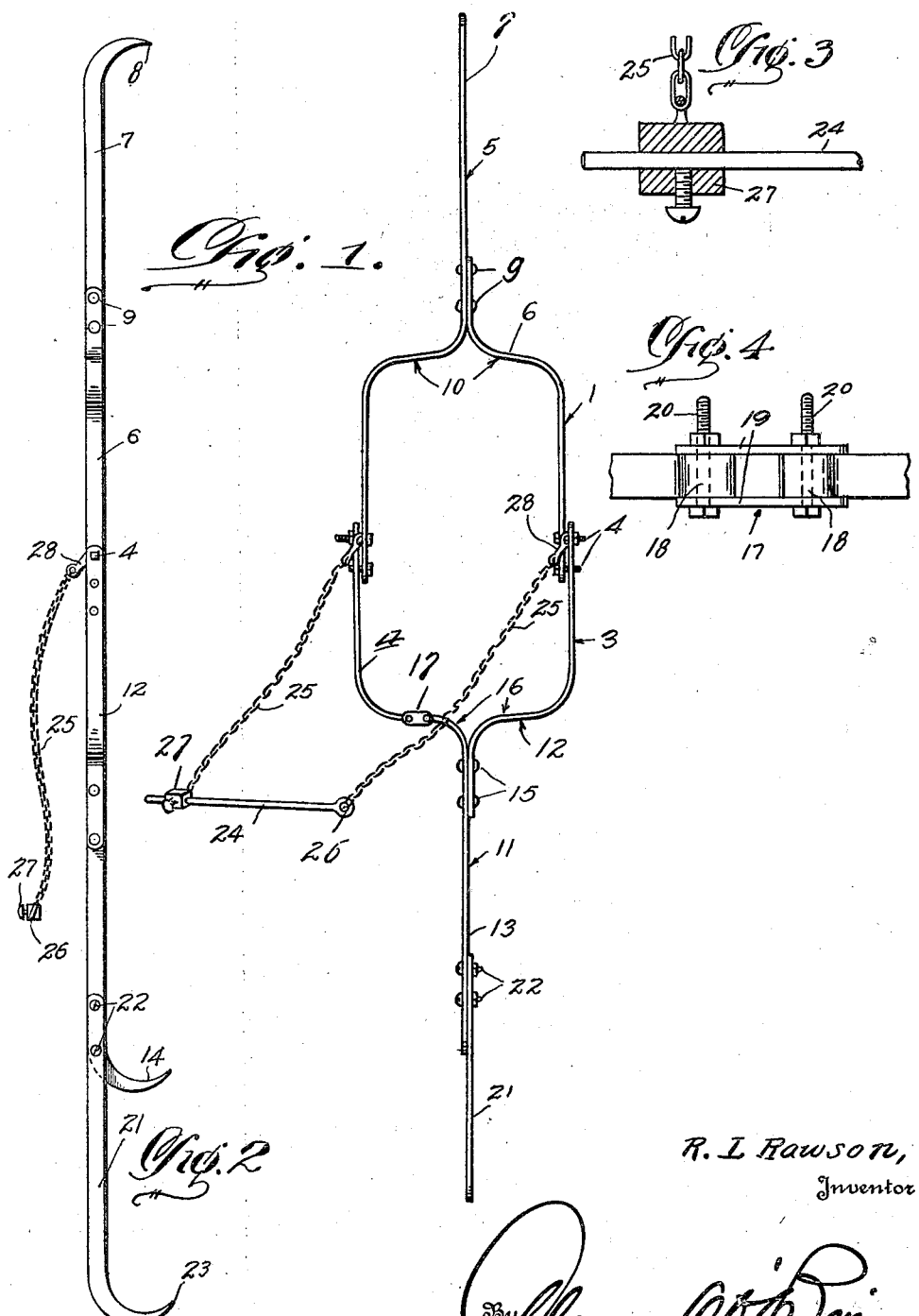

1,499,028

UNITED STATES PATENT OFFICE.

ROBERT L. RAWSON, OF WINONA, KANSAS.

CATTLE POKE.

Application filed April 17, 1923. Serial No. 632,660.

*To all whom it may concern:*

Be it known that ROBERT L. RAWSON, a citizen of the United States, residing at Winona, in the county of Logan and State of Kansas, has invented certain new and useful Improvements in Cattle Pokes, of which the following is a specification.

This invention relates to cattle pokes, and includes a construction wherein a pair of U-shaped frame members are adapted to have their free ends adjustably connected together to form a neck yoke for application over the neck of an animal, each of said members being provided with arms extending above and below the neck yoke and provided with laterally extending prongs adapted to prick the animal. A rod having a pointed end adapted for piercing the web between the nostrils of the animal's nose is provided with a pair of flexible members for connection with opposite sides of the yoke to prevent the animal from going through fences by reason of the engagement of the yoke and the arms extending therefrom engaging with the fence and exerting a pull upon the rod-like member which will hurt the animal's nose and cause it to back away from the fence.

The specific construction and features of the invention are pointed out in the following description and claim and shown in the accompanying drawing wherein:

Figure 1 is a front elevation of the yoke with the parts arranged in assembled position.

Figure 2 is a side elevation of the yoke.

Figure 3 is a detail view illustrating the manner in which one of the flexible members is adjustably connected to the pointed rod.

Figure 4 is another detail view showing the manner of hinging a portion of the yoke so that the same may be open to place the yoke over an animal's neck.

1 indicates the yoke adapted for engagement over the animal's neck which is formed of a pair of U-shaped sections 2 and 3 having the free ends adjustably secured together in yoke forming relation by bolts or other means indicated at 4. The upper U-shaped section 2 is formed of a pair of strip members 5 and 6, the member 5 being substantially longer than the member 6 for the purpose of providing an upwardly extending arm 7 above the yoke 2 provided with a rearwardly extended pointed end 8, the two members being secured together as indicated at 9 and formed with oppositely extending offset portions 10 to provide the upper portion of the yoke.

The lower U-shaped section 3 is also formed of a pair of strip members 11 and 12 respectively corresponding with the members 5 and 6, in that the member 11 is substantially longer than the member 12 to provide a downwardly extending arm 13 formed at the lower end with a rearwardly extending pointed end 14, the members being secured together as indicated at 15 and offset laterally opposite each other as at 16 to provide the lower half of the yoke 1. The member 11 however, is severed in its offset portion as indicated at 17 to provide a hinged section for permitting the application of the yoke over the neck of an animal. The severed ends of the section 11 are formed into eyes 18 pivotally connected to the plates 19 by bolts or the like 20. An arm 21 is secured to the lower end of the strip member 11 as indicated at 22 and extends below the pointed end 14 on said member 11 terminating in a rearwardly extending pointed end 23. The bolts 4 are adapted for engagement in any of a plurality of openings formed in the free ends of the U-shaped members 2 and 3 for the purpose of permitting adjustment of the relative size of the yoke to relative different sized necks of animals.

A pointed rod 24 is adapted for piercing the web of the animal's nose between the nostrils and is provided with a pair of flexible members 25, one of said flexible members being connected with an eye 26 at one end of the pointed member 24 and the other flexible member being connected to said member 24 through a slidable and removable terminal 27 which is adapted to fit over the pointed end of the member. These flexible members 25 are provided with snap fasteners 28, at the opposite free ends, adapted to connect the members at opposite sides of the yoke over the bolt 4.

From the above description, it will be seen that the two U-shaped sections of the yoke may be adjusted to fit an animal's neck and applied thereto by opening the pivoted sections of the strip member 11 so that the pointed ends of the members 7, 11, and 21 will extend rearwardly and be positioned to prick the animal's body under certain conditions. The pointed rod 24 is inserted through the web of the nose of the animal, and the flexible connections 25 extended at each side of the head of the animal and connected with the bolts 4 at opposite sides of the yoke 1, so that, should the animal endeavor to climb through a fence, the arms 7 and 13 will engage the fence wire and force the yoke rearwardly on the animal's neck and tighten the flexible members 25 and exert a pull on the rod 24 to exert a distortion of the web of the animal's nose to cause the animal to withdraw from the fence by reason of the feeling exerted on the animal through the nose. If this does not have sufficient effect to stop the animal, the prongs 8, 14, and 23, are adapted to push in the animal's body to create a further sensitive feeling to the body of the animal for making it withdraw from the fence.

From the above description, it will appear that the device is very simple in construction, which enables its manufacture at a small cost, making it a thoroughly practical and economical structure for effectively accomplishing the desired result.

What is claimed is:

An animal poke comprising a pair of U-shaped sections, one of these sections having a side portion which is hingedly connected with the intermediate portion of the said section, the ends of the sections being pivotally connected together, means for limiting the swinging movement of the section with relation to each other, chains connected with the sections at the point of pivotal connection between the sections. a pin carried by one chain and a block carried by the other chain, said block having an opening adapted to receive the pin and means for securing the block upon the pin.

In testimony whereof I affix my signature.

ROBERT L. RAWSON.